United States Patent [19]

Tucker et al.

[11] Patent Number: 4,632,061
[45] Date of Patent: Dec. 30, 1986

[54] BIRDFEEDER

[75] Inventors: James E. Tucker, Batavia; Charles W. Lohmeyer, Barrington; John Beecher, III, Carpentersville; James C. Stephen, Arlington Heights, all of Ill.

[73] Assignee: Weber-Stephen Products Co., Palatine, Ill.

[21] Appl. No.: 734,339

[22] Filed: May 14, 1985

[51] Int. Cl.⁴ ............................................. A01K 39/01
[52] U.S. Cl. .................................................. 119/51 R
[58] Field of Search ................ 119/51 R, 52 R, 51.13

[56] References Cited

U.S. PATENT DOCUMENTS

| 3,900,007 | 8/1975 | Smith | 119/51.13 |
| 4,030,451 | 6/1977 | Miller | 119/51 R |
| 4,188,913 | 2/1980 | Earl | 119/51 R |
| 4,259,927 | 4/1981 | Clarke | 119/51 R |
| 4,327,669 | 5/1982 | Blasbalg | 119/51 R |
| 4,328,765 | 5/1982 | Kilham | 119/51 R |
| 4,389,975 | 6/1983 | Fisher, Jr. | 119/51 R |
| 4,498,423 | 2/1985 | Gainsboro | 119/51 R |

Primary Examiner—Robert P. Swiatek
Assistant Examiner—Jay N. Eskovitz
Attorney, Agent, or Firm—Robert E. Wagner; Ralph R. Rath

[57] ABSTRACT

A birdfeeder consisting of a center column or post that has a multi-sided sloped roof on the upper end thereof and downwardly-directed abutments spaced inwardly from the outer edges. A lower support member is carried by the post and a plurality of identical compartments are configured to be inserted by sliding engagement with the outer wall against the abutment and subsequent inward tilting to position the lower edge over the support member to rest on the support member.

17 Claims, 7 Drawing Figures

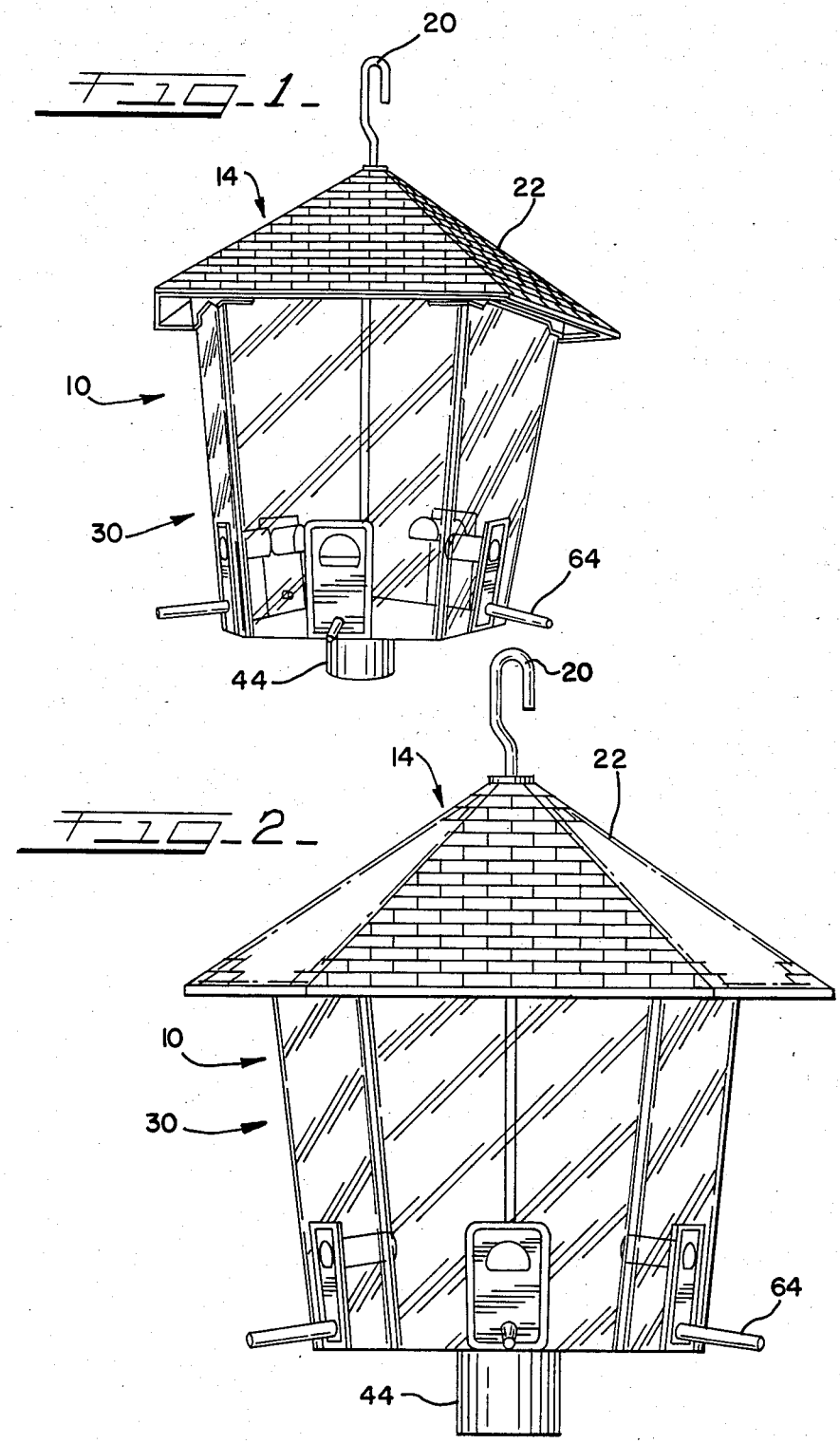

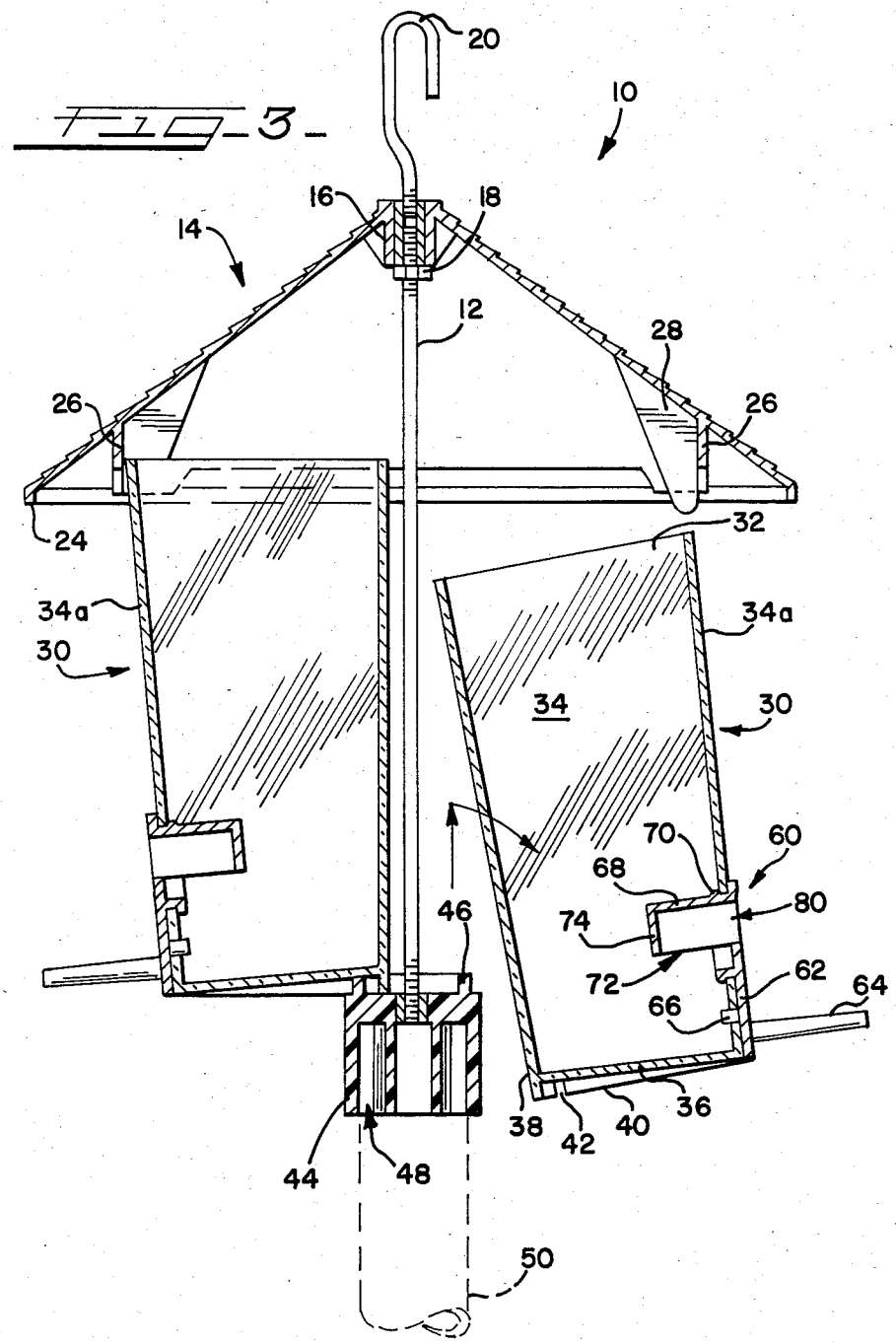

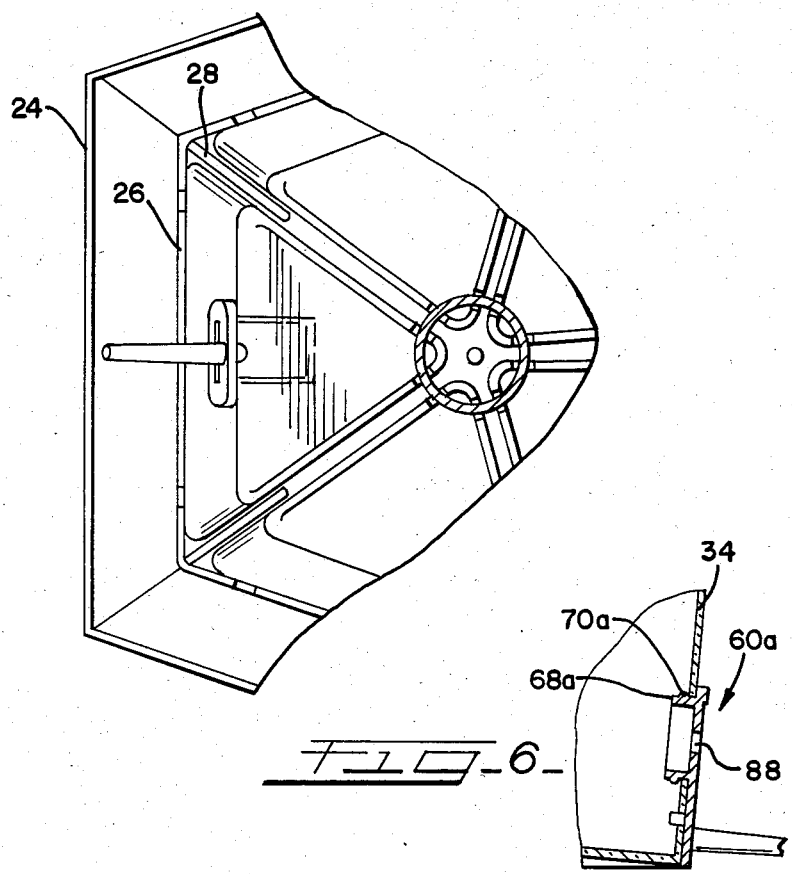
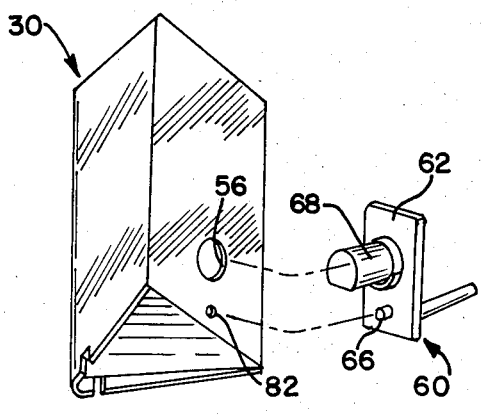

BIRDFEEDER

DESCRIPTION

1. Technical Field

The present invention relates generally to birdfeeders and, more particularly, to those of the hanging or post-mounted type.

2. Background Prior Art

Birdfeeders have, for years, employed a plurality of sidewalls formed of wood or glass which define an interior storage compartment for feed. At least some of the sidewalls are tapered inwardly with a slot at the lower end where the feed is discharged downwardly onto a feed table. This type of birdfeeder is particularly adapted for the mixture of bird feed so that a variety of the seeds are available to different species of birds.

In more recent years, the vertical hanging-type of birdfeeder has been marketed which normally include a transparent tube having a plurality of spaced apertures in the sidewall through which the food is accessible to the birds. Examples of such type of birdfeeder are disclosed in U.S. Pat. Nos. 4,246,869 and 4,259,927.

Multiple-compartment birdfeeders have also been proposed whereby different types of feed can be placed into the different compartments to attract different species of birds.

One of the know disadvantages of birdfeeders is the difficulty encountered in filling the interior storage compartment or compartments with feed. With many feeders it is necessary to remove the top of the feeder, and this becomes difficult, particularly in those instances where the feeder is suspended from above in a tree.

Another problem encountered is the wasted feed that invariably ends up on the ground below the birdfeeder because of the construction of the access ports to the interior of the feeder. To alleviate this problem, proposals have been made to minimize the amount of feed that can be removed by the birds from the access ports; examples of devices designed for this purpose are disclosed in U.S. Pat. Nos. 3,568,641 and 4,259,927.

While numerous different types of birdfeeders have been developed and are being marketed, there is a continual need for a multi-compartment unit which is aesthetically attractive and which is easy to assemble and to remove compartments for filling purposes.

SUMMARY OF THE INVENTION

According to the present invention, the birdfeeder of the present invention consists of a central support column having a fixed roof at the upper end of the column and a plurality of separate, substantially-identical compartments surrounding the vertical center column which are suspended on the column without the use of any special fasteners.

More specifically, the fixed roof, which is sloped downwardly from the center column or post, is multi-sided and has a plurality of peripheral abutments spaced inwardly from the outer edges with an equal number of separate compartments suspended on the center post or column and cantilevered into engagement at their upper ends with the abutments.

In the preferred embodiment, the roof is five-sided with an equal number of compartments. Each compartment is triangular in cross-section with the apex of the triangle being located adjacent the center column or support. Each separate compartment has an opening at the top and has a reducing taper from the top to a bottom wall with the bottom wall being tapered towards an outside wall of the compartment.

The hub or compartment support member is secured to the column or post below the roof and the hub is in the form of a peripheral flange that defines a downwardly-opening socket for a post. Each of the apex portions of the triangular feed compartments has an upwardly-opening slot which receives the flange so that each compartment has its upper open end located under the roof and an upper edge in abutting relation with the abutments depending from the roof. With this arrangement, the compartments can easily be removed by lifting and tilting without the use of any special tools or extraneous fasteners.

According to one aspect of the invention, each of the compartments has a perch and access port assembly insert consisting of an elongated main body having a perch extending from one side and a short projection extending from an opposite side, with the projection having an outwardly-directed rib spaced from the main body. A generally-circular flange extends from the opposite side of the main body above the perch and has an opening through the main body to define an access port. In one embodiment, the flange extends a substantial distance inwardly and has a lower portion removed to define a covered access opening for gaining access to the bird feed inside. In the alternate embodiment, a small elongated slot is centered within the flange to define a small access port for specialty feed, such as thistle.

BRIEF DESCRIPTION OF SEVERAL VIEW OF DRAWINGS

FIG. 1 is a perspective view of the birdfeeder constructed in accordance with the teachings of the present invention;

FIG. 2 is a side elevational view, similar to FIG. 1, showing the assembled condition for the birdfeeder;

FIG. 3 is an enlarged cross-sectional view through the center of the birdfeeder showing the manner of manipulation of the compartments for insertion and removal;

FIG. 4 is a fragmentary bottom view showing details of assembly;

FIG. 5 is a perspective view of one of the compartments;

FIG. 6 is a fragmentary sectional view of a portion of the compartment having a modified perch and access insert inserted into position; and, FIG. 7 is a view similar to FIG. 5 showing the modified form of the perch and access insert.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiment illustrated.

FIG. 1 of the drawings shows the birdfeeder, generally designated by reference numeral 10, constructed in accordance with the teachings of the present invention. The birdfeeder 10 consists of a center support column or post 12 (FIG. 3) that has a roof 14 at the upper end thereof. The center column or post 12 may be in the form of a cylindrical rod that is threaded at its upper end, which receives a threaded coupling or bushing 16 that is molded as an integral part of the roof structure. A lock nut 18 may be utilized to define the final position of the roof on the rod. The hook 20 may also be threaded into the bushing 16 to define a support for suspending the birdfeeder, if desired.

The roof 14 is sloped downwardly from the center post and is multi-sided, with five sides 22 being illustrated, all of which terminate in a common lower edge 24. An abutment 26 depends from the inner surface of each side 22 of the roof 14 at a point spaced inwardly from the lower edge 24. The purpose of this abutment will be described later.

The abutment 26 has an inwardly-directed portion 28 (FIG. 4) located at the juncture of two adjacent sides 22.

According to a primary aspect of the present invention, the birdfeeder 10 has a plurality of compartments 30 that are substantially identical in construction and can easily be installed and removed from the center support column 12. In the illustrated embodiment, the compartments are triangular in cross-section, as shown in FIG. 5, and have an upper open end 32 defined by three substantially identical sidewalls 34. The sidewalls 34 are tapered inwardly slightly from the upper open end 32 to a lower bottom wall 36 which is tapered downwardly from an inner apex portion 38 to the outer wall 34a. The bottom wall 36 is spaced inwardly from the lower edge of two of the sidewalls to define a short extension 40, which has a slot 42 adjacent the apex portion 38.

As indicated above, the respective feed compartments 30 are constructed and designed to be capable of being positioned onto the center column 12 and easily removed without the use of any special tools or fasteners. For this purpose, the center support column or member 12 has a hub 44 at the lower end thereof, and the hub has an upwardly-directed flange 46 around the outer periphery. The upwardly-directed flange 46 is configured to be received into the slot 42. The hub 44 also has an annular opening 48 which defines a socket for receiving a post 50 so that the birdfeeder may either be suspended from the hook 20 or supported on a post 50.

Each of the compartments 30 can therefore be easily assembled onto the center support column 12 without the use of any special tools or fasteners. The compartment 30 is moved upwardly under the roof inwardly of the abutment or ledge 26 into a sliding engagement therewith so that the open top 32 is located under the roof 14. The inwardly-directed abutment portions 28 assure accurate positioning of the upper end of the compartment with respect to the side 22 of the roof. The compartment 30 is raised sufficiently to clear the lower edges of the walls or extensions 40 above the flange 46 and then is tilted inwardly to align the slot 42 with the flange 46. The flange is then received into the slot 42 to secure the compartment 30 in a cantilevered position between the abutment 26 and the flange 46. When it becomes time to remove and fill the respective compartments, it is only necessary to lift the compartment 30 and tilt the compartment outwardly, as shown by the arrows in FIG. 3, so that each compartment can be independently removed and refilled when desired. The inner ends of extensions may be tapered to act as a guide for guiding the comparment over flange 46.

According to one aspect of the invention, the respective compartments have a common access opening 56, which is constructed to receive a specially-configured insert 60 which is designed to provide different access ports for different types of birdseed. The insert 60 comprises a main body 62 that has a perch 64 extending from one side thereof and a small, short projection 66 extending from the opposite side, in close proximity to the perch. A generally-circular flange 68 extends inwardly from the opposite side of the main body 62 and has a circumferential rib 70 spaced inwardly from the main body 62 by a small dimension which is equal to the wall thickness of the outer wall 34a. As shown in FIG. 3, the lower portion of the flange 68 is removed to provide a downwardly-opening access port 72, the inner end of which is closed by a wall 74. The main body 62 also has an access port 80 which is coicident with the diameter of the flange 68 so that a bird may rest on the perch 64 and gain access to the birdseed through the access port 80 and the downwardly-directed opening 72.

Thus, the insert 60 can easily be inserted into the opening 56 in the outer wall 34a and the projection 66 will be received into a reduced opening 82 located below the enlarged opening 56. The enlarged rib will provide a snap-fit against the inner surface of the wall 34a to secure the insert onto the compartment 30. If desired, the projection 66 may likewise have rib spaced from the main body 62 and provide a further snap-fit arrangement for the insert on the compartment. In certain instances, the entire rib on the projection 66 may not be needed and a portion of the lower portion of the rib 70 may also be eliminated.

The insert 60 is designed and configured to be used for dispensing the larger variety of birdseed, such as sunflower seeds, and the hooded or covered configuration of the inner portion of the flange 68 will allow the birdseed to flow by gravity around the flange 68 and be accessible through the opening 72.

For certain types of birdseed, it may be desirable to have a different type of construction for the access port. Thus, as illustrated in FIGS. 6 and 7, the insert 60a may be configured for dispensing smaller types of birdseed, such as thistle. The insert 60a again consists of a main body 62a having a perch 64a extending to one side thereof and a projection 66a extending towards the opposite side. Again, a circular flange 68a extends inwardly from the main body above the perch 64a and the flange has a rib 70a adapted to engage the inner surface of the outer wall 34a. In the embodiment illustrated in FIG. 6, the access port is in the form of a narrow, elongated slot 80 centered in the circular flange 68a.

As can be appreciated from the above description, the birdfeeder constructed in accordance with the present invention provides great versatility for dispensing different types of birdseed utilizing the same compartment construction with only modification of a molded plastic insert 60. Each of the compartments being identical in construction will reduce the inventory necessary for a manufacturer, and the construction of the compartments and the remaining components of the birdfeeder makes the unit easy to assemble without the use of any tools and the compartments can readily be removed and refilled when necessary.

Of course, it will be appreciated that the particular cross-sectional configuration and size of the compartments could easily be varied without departing from the spirit of the invention. For example, the outer walls 34a could be arcuate in configuration so that the periphery of the birdfeeder would be circular in cross-section. Also, the number of compartments could easily be varied to suit the desires of a particular user. The compartments could also be trapazoidal in cross-section. In addition, additional inserts 60 could be provided with different types of access ports for any given particular type of birdseed.

We claim:

1. A multi-compartment birdfeeder comprising a center support member having a fixed roof at an upper end thereof and a compartment support member at a lower end and access means for birds to gain access to the compartment interior, means for supporting said center support member in a generally upright position, a plurality of substantially identical compartments each having an upper open end, said fixed roof having downwardly-depending abutment means along the periphery for slidably receiving an upper peripheral portion of each compartment, and support means on a lower end of each compartment received on said compartment support member so that each compartment can be inserted by producing sliding contact with the peripheral depending abutment means and moving compartment lower end onto compartment support member whereby each compartment is supported between said abutment means and said compartment support member and can be removed by simply lifting said compartment off said compartment support member and tilting it outwardly to disengage the upper portion from the abutment means.

2. A birdfeeder as defined in claim 1, in which each compartment is generally triangular in cross-section and has an apex portion supported on said compartment support member.

3. A birdfeeder as defined in claim 2, in which said roof is pentagonal in plan view and there are five compartments positioned around said center support member.

4. A birdfeeder as defined in claim 2, in which said compartment support member includes an upwardly-directed flange and each apex portion has a slot receiving said flange.

5. A birdfeeder as defined in claim 4, in which said flange is circular and defines a socket for receiving a post to support the birdfeeder.

6. A birdfeeder as defined in claim 2, in which said roof is pitched and multi-sided with an abutment extending downwardly adjacent the periphery of each side.

7. A birdfeeder as defined in claim 1, in which said access means includes an opening and an insert received into said opening, said insert including a perch extending outwardly adjacent a lower end and an access port adjacent the upper end.

8. A birdfeeder as defined in claim 7, in which said insert includes a hooded portion extending into said opening, said hooded portion being open along a bottom portion to define said access port.

9. A birdfeeder as defined in claim 7, in which said insert has a flange received into said opening with said access port located inside said flange.

10. A birdfeeder as defined in claim 1, further including a hook extending above said roof and aligned with said center support member.

11. A birdfeeder comprising a center support member having a roof at an upper end thereof, said roof having sloping segments terminating in peripheral edges and downwardly-directed abutments spaced from said edges, a plurality of removable feed compartments, each being multi-sided in cross-section and open at the top and having an inner apex portion, and support means on said center support member spaced from said roof for receiving and supporting a lower end of said apex portion of each compartment so that each compartment can be assembled by manipulating said upper open end under said roof to place it in sliding contact with an abutment and tilting the compartment support inwardly to have said apex portion rest on said support means whereby each compartment can easily be removed by lifting and tilting and without disassembly of the remainder of the feeder.

12. A birdfeeder as defined in claim 11, in which said center support member is a rod having a hub at its lower end defining said support means.

13. A birdfeeder as defined in claim 12, in which said hub has an upwardly-directed flange and each apex portion has a slot for receiving said flange.

14. A birdfeeder as defined in claim 13, in which said hub is circular and defines a downward opening socket for receiving an upper end of a post.

15. A birdfeeder as defined in claim 11, in which each compartment has an enlarged opening and a reduced opening in an outer wall, an insert including a plate portion having a perch extending to one side and a projection extending from an opposite side and received into said reduced opening with a flange extending from said opposite side above said projection and surrounding an access port, said flange corresponding to and extending through said enlarged opening.

16. A birdfeeder as defined in claim 15, in which said flange extends inwardly of said outer wall and has a lower portion removed to define a downward opening covered access opening.

17. A birdfeeder as defined in claim 15, in which said access port is substantially smaller and centered within said flange and said flange has a rib spaced from said plate portion.

* * * * *